United States Patent [19]

Takada, deceased et al.

[11] 3,897,082
[45] July 29, 1975

[54] VEHICLE SAFETY BELT APPLYING MECHANISM

[75] Inventors: Takezo Takada, deceased, late of Tokyo, Japan; by Juichiro Takada, legal authorized heir, Tokyo, Japan

[73] Assignee: Takata Kojyo Co., Ltd., Tokyo, Japan

[22] Filed: Dec. 14, 1973

[21] Appl. No.: 424,968

[30] Foreign Application Priority Data
Dec. 16, 1972  Japan.............................. 47-125815

[52] U.S. Cl............. 280/150 SB; 297/385; 297/388
[51] Int. Cl............................................. B60r 21/10
[58] Field of Search............. 280/150 SB; 180/82 C; 297/385, 388

[56] References Cited
UNITED STATES PATENTS
3,613,819  10/1971  Maloney.......................... 297/388 X
3,653,714  4/1972   Gentile............................ 297/388 X Primary Examiner—David Schonberg
Assistant Examiner—Michael J. Forman
Attorney, Agent, or Firm—Wolder & Gross

[57] ABSTRACT

A mechanism for automatically applying a safety belt to a seat occupant includes a forwardly open arcuate case extending rearwardly of the seat and slideably housing a pair of radially offset quadrant arcuate transfer arms. A gear reduction motor driven, longitudinally grooved drive roller is housed below the seat and opposite sides of the roll are engaged by helical wound flexible cables, the ends of each of which is attached to the proximal ends of respective transfer arms and are guided to the arm proximal end from its front and rear, so that forward rotation of the drive roll advances the arm distal ends forwardly and toward each other, and reverse rotation of the drive roll retracts the arms into the case. A collar is mounted on the distal end of one arm, and slideably engages a waist belt extending from a retractor reel. In one form, a similar collar is mounted on the other arm and engages an opposite belt extending from a retractor, the belts carrying mating buckle members. In another form, the other transfer arm carries a transfer member which, in the transfer member advanced conditions engages a coupling member mounted on the end of the belt and draws it into engagement with a mating coupling member on the other side of the seat, with the retraction of the transfer arms.

9 Claims, 13 Drawing Figures

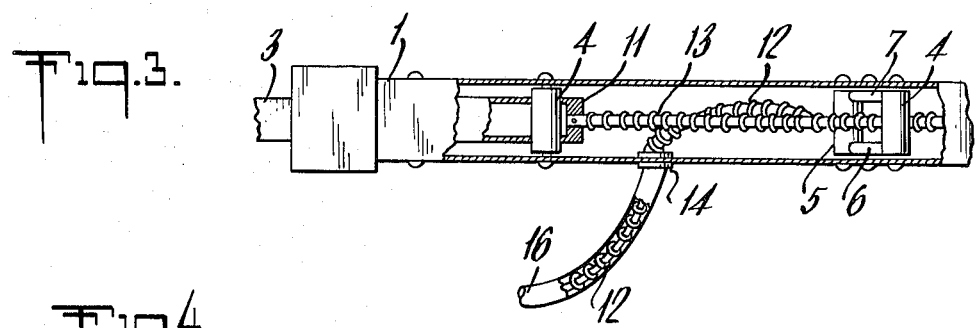
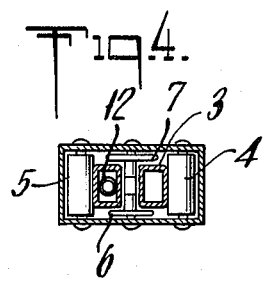
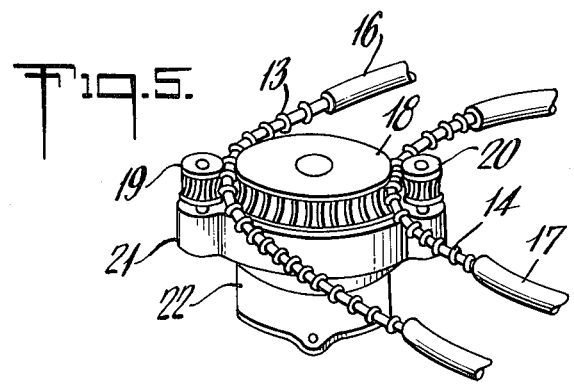
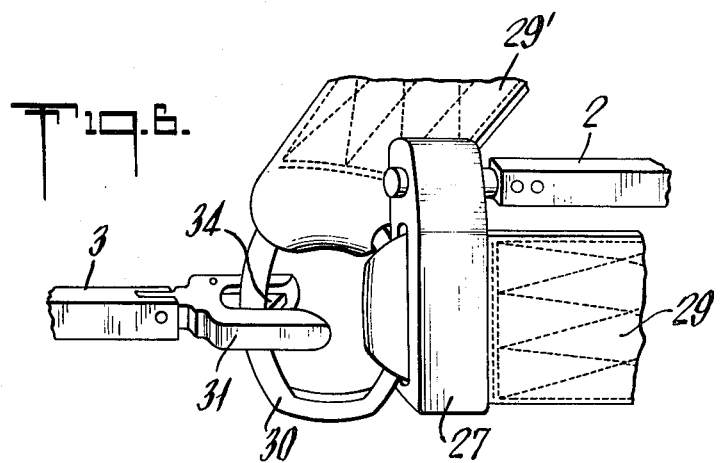
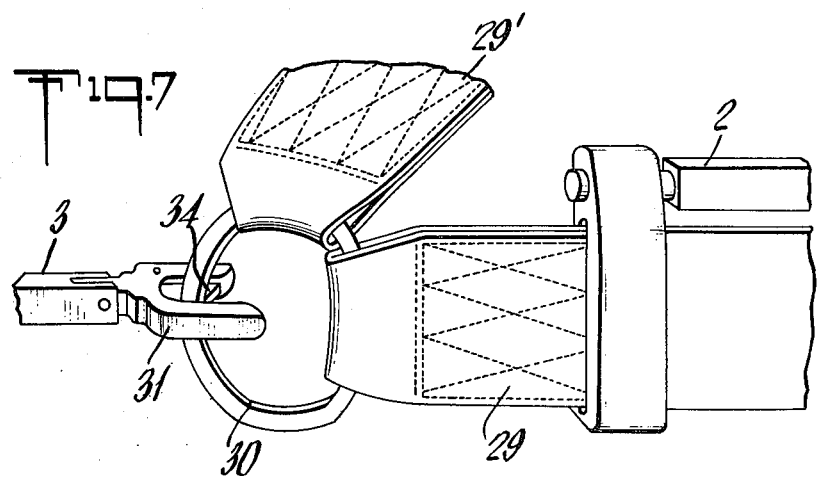

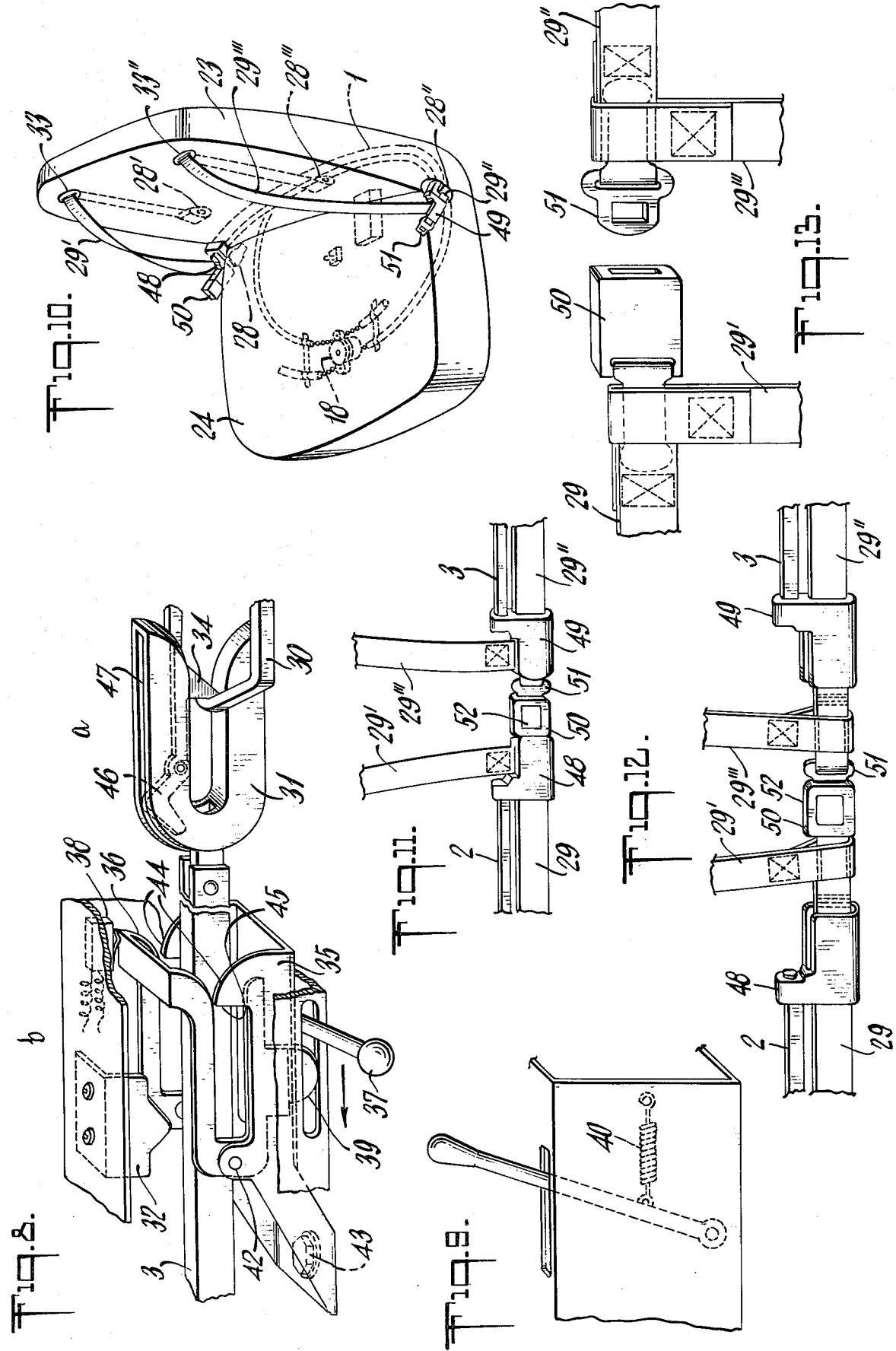

VEHICLE SAFETY BELT APPLYING MECHANISM

The present invention relates generally to improvements in safety belt mechanisms and it relates particularly to an improved mechanism for automatically applying a safety belt to the occupant of a vehicle seat without any choice on the part of the occupant.

The benefit of the safety belts in motor vehicles and such is very evident, but they possess the important drawback that there are only few who actually wear the safety belt while driving or riding in the vehicle, due to the lack of a suitable method which compels the driver or passenger to wear the belt, and thus, the safety belts in vehicles are mostly left idle and are unable to perform their intended functions in the event of an accident.

In order to solve such problems, the present invention provides a device which automatically operates to apply the safety belt to the driver or passenger in a vehicle, without any choice on his part, when he merely occupies the seat in the vehicle and closes the door, thereby to protect the seat occupant against serious injuries or death in the event of an abnormal occurrence such as a sudden stop, collison or a falling of the vehicle. The device, according to the present invention, as compared with the complicated mechanisms in the conventional devices of this type, is designed to minimize the number of gears and other rotating parts in the drive transmission mechanism, and to also simplify the mechanical arrangements by transducing the rotational motion directly into linear motion to achieve positive, reliable and secure operations. Also, the drive unit and the arm housing assembly are arranged separate from each other and connected by flexible helical cables to minimize the space required for the installation in the seat as well as facilitating the setting of the mounting positions and the mounting operations. There is thus provided, according to the present invention, a device for protecting the vehicle driver or passenger against possible injuries or death in the event of a traffic accident, such device being of low cost and of high protective effect.

The characteristic structural features of the device according to the present invention are discussed in detail with reference to the accompanying drawings, which illustrate preferred embodiments of the present invention and wherein:

FIG. 3 is a fragmentary elevational view, with parts broken away, showing the interior structure of a section of the transfer arm housing case;

FIG. 4 is a sectional view taken along the line X-X' in FIG. 2, showing the condition in which a transfer arm is retracted and housed;

FIG. 5 is a detail perspective view showing the drive assembly in engagement with the flexible cables;

FIG. 6 is a perspective view illustrating the joined belt portion in an arm advanced and transferred condition;

FIG. 7 is a view similar to FIG. 6 illustrating the transfer arms being retracted;

FIG. 8 is a fragmentary perspective view of the safety belt coupling and locking mechanisms;

FIG. 9 is a fragmentary bottom perspective view of the mechanism shown in FIG. 8;

FIG. 10 is a perspective view of a four-point safety belt system according to another embodiment of the present invention and the associated vehicle seat;

FIG. 11 is a front perspective view illustrating the safety belt in a coupled condition and the transfer arm in advanced position;

FIG. 12 is a view similar to FIG. 11 illustrating the transfer arms in a partially retracted position; and FIG. 13 is a rear perspective view of the buckle and mating tongue coupling of the four-point safety belt.

Figure 1:
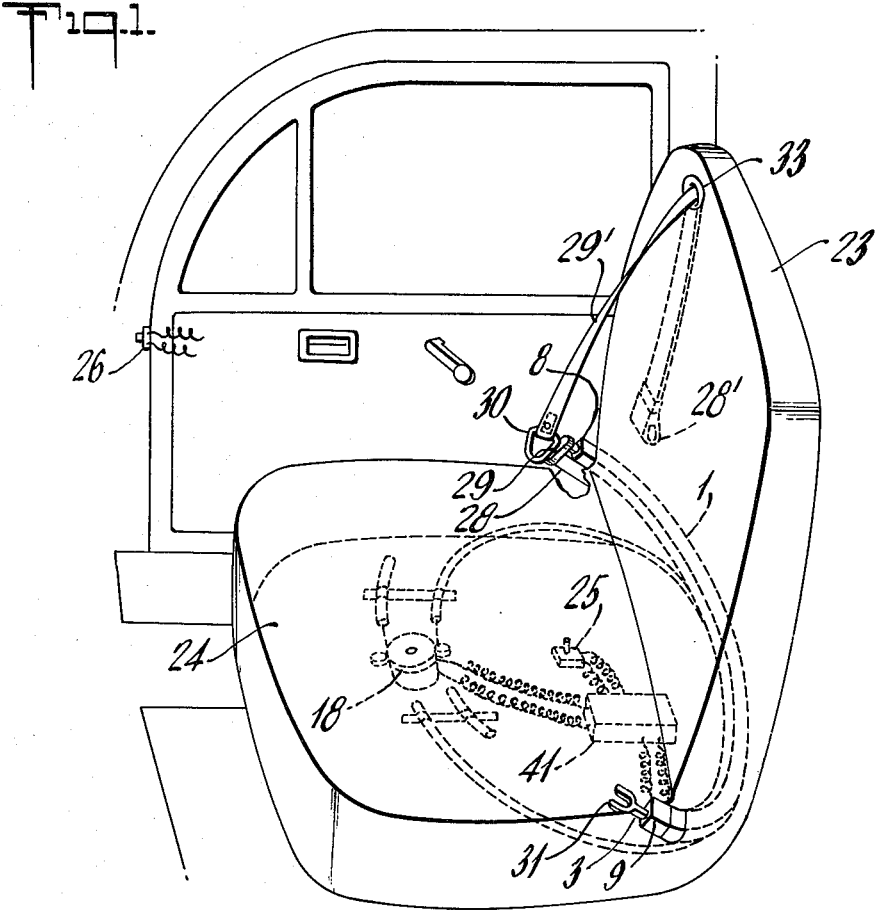
FIG. 1 is a perspective view of a three-point safety belt system according to the present invention shown with the associated vehicle seat and vehicle door.

Referring now to the drawings, particularly FIGS. 1 to 9 thereof which illustrate a preferred embodiment of the present invention, an arc-shaped housing case 1 made of light weight steel, synthetic resin or the like, is disposed in the lower part of a seatback or back portion 23, and both open end portions 8 and 9 of case 1 are fixed respectively to the right and left frame members of the seat at the locations where the seat cushion or portion 24 and the seat back 23 meet. Along the interior of case 1 are positioned sets of cylindrical rollers 4 and 5 and stepped rollers 6 and 7 in each of the case sections indicated by letters, B, C, D, E, F, G and H in FIGS. 2 to 4. Also disposed telescopically in case 1 are two radially offset first and second arcuate transfer arms 2 and 3, each of which is made of a light weight material such as aluminum and is slideably supported by the corresponding portions of the sets of four rollers which define first and second guide means respectively. The transfer arms are arranged so that they can extend out from the openings 8 and 9 at both ends of said case 1 toward a location in the center and forward of the seat, so as to surround the waist of an occupant of the seat. The proximal ends 10 and 11 of arms 2 and 3 are secured, within the case 1, to the helical flexible elongated members or transversely ridged cables or spiral wires 12 and 13, respectively. The first and second spiral wires 12 and 13 project through respective openings 14 and 15 in the underside of the case 1 and extend in respective guide means or pipes 16 and 17 connected to the outside of the case 1 and are engaged with a longitudinally grooved gear or drive roll 18 disposed within the seat cushion 24. The grooved gear 18 is connected to a motor drive 22 by way of a reduction gear 21 and which is fixed to the seat frame beneath the seat cushion 24. As shown in FIG. 5, a pair of longitudinally grooved rollers 19 and 20 are freely rotatably mounted on the casing of reduction gear 21, so as to guide the respective spiral wires 13 and 14, so that the latter are reliably, positively engaged with the grooved gear 18. At the end of the arm 2 is secured a first transfer member collar or hanger 27 provided with a slot which slideably engages the first safety belt 29 as shown in FIG. 6. Provided on the seat frame and in contact with the lower part of the opening 8 of the case 1 is a first connecting means defining spring biased reel type belt retractor 28 in which the safety belt 29 is normally stored in a wound-up state, the end of the safety belt 29 extending through the slot in the hanger 27 and secured to a first coupling member or ring 30. Another safety belt 29' functioning as a shoulder belt is rolled up in a retractor 28' and fixed at one end to a frame member of the seat back 23, with the other end of belt 29' passing through a guide 33 in the seat back 23 and secured to the ring 30.

At the end of the other transfer arm 3 there is mounted a transfer member yoke or fork shaped hanger or second transfer member 31 having a central opening for receiving the ring 30, as shown in the (a) portion of FIG. 8. In one of the yoke fingers there is deformed a rectangular groove 47 in which is provided a hook-shaped pawl 34 for engaging and catching the ring 30. The hook-shaped pawl 34 is spring biased to normally close the fork opening of the hanger 31. In the inside of the opening portion 9 of the case 1, as shown in the (b) portion of FIG. 8, are provided a hook-shaped locking frame 35 having a locking portion 45 which defines a second coupling member for securing and retaining the ring 30 of the safety belt 29 and an unlocking lever 36 having a projection 39, the unlocking lever 36 being pivotally secured to the locking frame 35 by a pin 42, and the opening 44 is spring biased to a normally closed position. In the open end portion 9 of the case 1 are also provided an unlocking handle 37, a cam 32 registering with the groove 47 in the hanger 31 so as to disengage the ring 30 from the pawl 34, and a switch 38 which senses or confirms the locking. Beneath the seat cushion 24 there is provided a control box 41, to which an occupied seat activated switch 25, a closed actuated switch 26, a motor switch 22, lock-confirming switch 38 and an arm switch (not shown) for reversing the motor 22 upon maximum elongation or full advance of the arms 2 and 3 are all electrically connected and interelated.

Figure 2:
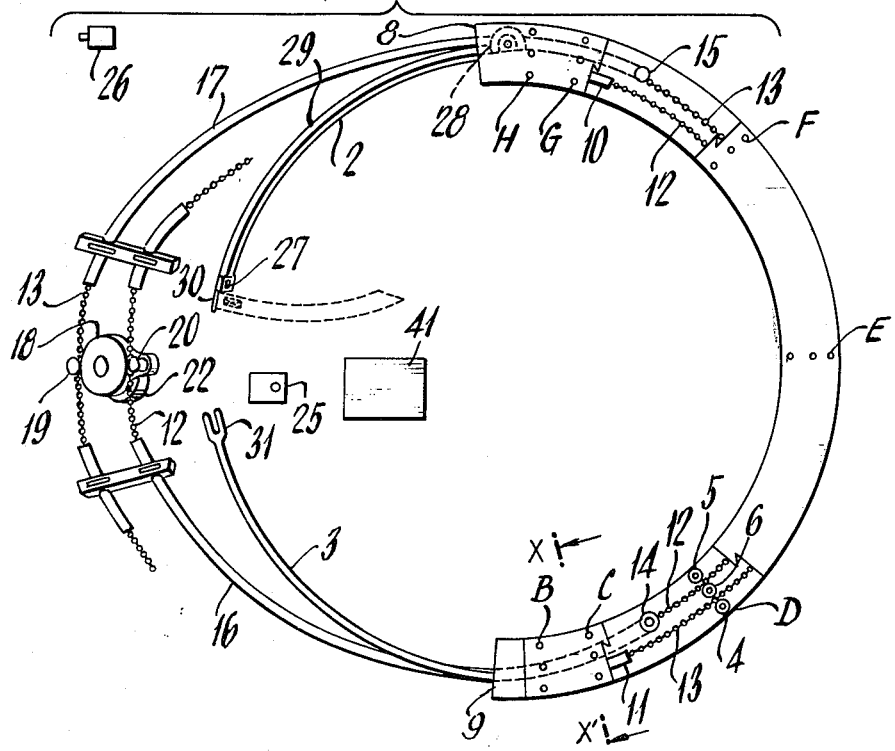
FIG. 2 is a top plan view of the automatic belt applying mechanism of the system of FIG. 1.

In the operation of the device described above, when a person sits on the seat and closes the door, the seat switch 25 and door switch 26 are actuated, which is sensed by the control box 41 to initiate rotation of the motor 22 shown in FIGS. 2 and 5, and the motor rotation is transmitted at a reduced speed by the reduction gear 21 to the grooved gear 18 to cause it to rotate clockwise, causing the spiral wires 12 and 13 to extend out respectively through the guide pipes 16 and 17 and the openings 14 and 15 in the case 1 to push out or advance the arms 2 and 3 connected to the ends of said respective wires. The arms 2 and 3 are thus advanced to extend toward a position in the center forward of the seat, while the hanger 27 at the end of the arm 2 simultaneously pulls out the safety belts 29 and 29' along with the ring 30, and finally the ring 30 is inserted into the opening in the hanger 31 at the end of the arm 3 at said center forward position, as shown in FIG. 6. In the meanwhile, the hook-shaped pawl 34 of the hanger 31 is pushed up by the ring 30, and after the ring 30 is received in the opening, said opening is closed by the spring biased pawl 34 to lock the ring 30, as shown in the (a) portion of FIG. 8. When the ring 30 is locked in the hanger 31 by the pawl 34, rotation of the motor 22 is reversed by the operation of the control box 41 to rotate the grooved gear 18 counter-clockwise, whereby the arms 2 and 3 are now retracted or pulled back by the respective spiral wires 12 and 13 into their retracted positions in the case 1. FIG. 7 shows the retraction of the arms 2 and 3 with the reversal of the motor rotation. As the arm 3 is retracted, the safety belts 29 and 29' are withdrawn from the respective retractors 28 and 28' by the ring 30 locked by the pawl 34 to the hanger 31. Then, as shown in the (b) portion of FIG. 8, the ring 30 bears on the locking frame 35 in the open end portion 9 of the case 1 and then against the cut-out portion 44 of the unlocking lever 36 to raise the lever 36, whereby the lock-confirming switch 38 is actuated to confirm the retraction of the ring 30. Then the ring 30 is received in the locking portion 45 of the locking frame 35 to effect the return of the unlocking lever 36 to its spring biased locked position, and the cam 32 enters the groove 47 in the hanger 31 to depress the cam portion 46 of the pawl 34 and release the engagement between the ring 30 and pawl 34, whereupon the ring 30 is now locked in the locking portion 45 of the locking frame 35 and thus the waist belt 29 and the shoulder belt 29' are properly attached to the seat occupant, the driver or passenger. At the same time, the arm switch (not shown) is turned off to stop the motor 22, whereby any further retraction force on the transfer arms 2 and 3 is also stopped.

For releasing or unbuckling the safety belts which have thus been locked, the manual release handle 37 provided in the case 1 is pulled in the direction of the arrow as shown in FIGS. 8 and 9, whereby the unlocking lever 36 is raised by the pressure on the protuberance 39 to free the ring 30 from the locking frame 35, to thereby unbuckle the belts. The belts are then rewound into their original retracted positions by the action of the return springs provided in the respective retractors 28 and 28'.

An automatic applying mechanism for a safety belt system comprising two waist belts and two shoulder belts, generally known as a four-point system safety belt, according to another embodiment of the present invention, is described with particular reference to FIGS. 10, 11, 12 and 13.

In the four-point safety belt system applying mechanism unlike the mechanism described above for the three-point system, the locking means in the open end portion 9 of the case 1, the manual unlocking means, the cam means for disengaging the hook-shaped pawl 34 and ring 30, and the lock-confirming switch 38 are all eliminated. Also, the hangers 27 and 31 at the ends of the arms 2 and 3 are eliminated and instead hangers 48 and 49 such as shown in FIG. 11, are provided. Secured on the seat frame members and in contact with the undersides of the right and left open end portions 8 and 9 of the case 1 are first and second connecting means defining retractors 28 and 28'' in which the first and second waist belts 29 and 29'', respectively, are contained in a rolled-up state. The end of the belt 29 is withdrawable from the retractor 28, passes through an opening in the hanger 48 and is secured to a coupling buckle 50, while the other waist belt 29'' is withdrawable from the retractor 28'', passes through an opening in the hanger 49 and secured to a coupling tongue 51. On the other hand, the retractors 28' and 28''' containing the shoulder straps 29' and 29''', respectively, are mounted on the frame members of the seat back 23, and the end of the strap 29' extends from the retractor 28', passes through a guide 33 provided in the seat back 23 and is sewn to a part of the waist belt 29 adjacent the buckle 50, while the end of the other shoulder strap 28''' extends from the retractor 28''', passes through a guide 33'' in the seat back 23 and is sewn to a part of the waist belt 29''' adjacent the tongue 51. The buckle 50 and tongue 51 have longitudinal tongue shaped extensions at their rear ends, such as shown in FIG. 13, which are adapted to fit into longitudinal channels or slits in the hangers 48 and 49, respectively, so as to hold the buckle 50 and tongue 51 in a predetermined angular relation to each other, In the buckle 50 there is also located a lock-confirming switch (not shown) which is connected to the control box 41, so that it will be actuated when the tongue 51 is inserted into and locked with the buckle 50. The other arrangements are the same as those used in the three-point safety belt system mechanism earlier described.

Concerning now the operations of the four-point safety belt system mechanism, only the operations which are different from those of the three-point device already described are hereinafter discussed.

When a person occupies the seat in a vehicle provided with the last described mechanism and closes the door, the seat switch 25 and door switch 26 are closed to energize the motor 22 through the control box 41, causing the respective transfer arms 2 and 3 to advance toward a position in the center forward of the seat. Such operation is the same as in the three-point belt device described above. As the arms 2 and 3 are thus advanced, the hangers 48 and 49 are also advanced and transport therewith the buckle 5 and belts 29 and 29', and the tongue 51 and belts 29'' and 20''', respectively, until finally the buckle 50 and tongue 51 are engaged and locked with each other at a medial position as shown in FIG. 11, to thereby effect the application of the four-point safety belt to the seat occupant. When the buckle 50 and tongue 51 are thus locked, the motor 22 is reversed upon the actuation of the lock-confirming switch by the control box network 41, causing the arms 2 and 3 to return to their original retracted positions, and when this is accomplished, the motor 22 is stopped upon the actuation of the arm switch by the control box 41 to consequently stop the motor and movements of the respective arms 2 and 3. FIG. 12 shows the condition during which the arms 2 and 3 are being retracted in the manner described above. For uncoupling the locked belts, the belt wearer merely depresses a push-button 52 on the buckle 50 to unlock the buckle and tongue, whereby the belts 29, 29', 29'' and 29''', are all retracted and spring rewound in the respective retractors 28, 28', 28'' and 28''', and the buckle so and tongue 51 are returned to and firmly releasably retained by the respective hangers 48 and 49.

While the present invention has been described by way of examples as adapted to three-point and a four-point safety belt systems, it will be apparent that the applicator mechanism can as well be applied to a two-point system belt. It is further obvious that numerous other alterations, omissions and additions may be made without departing from the spirit of the present invention.

I claim:

1. A mechanism for automatically applying restraint to the occupant of a seat, including a seat portion and a back portion comprising a first belt, first connecting means, including a spring biased belt retractor connecting said belt proximate a first side of said seat, a first coupling member located on said first belt proximate the free end thereof, a second coupling member releasably engageable with said first coupling member, second connecting means connecting said second coupling member proximate a second side of said seat opposite to said first side, a first arcuate transfer arm, first guide means supporting said first transfer arm for movement along the arcuate length of said first transfer arm between a retracted position with the distal end of said transfer arm proximate the rear of said seat portion first side and a position toward said seat second side, a first transfer member mounted on said first transfer arm distal end portion and engaging said first belt to advance the free end thereof with the advance of said first transfer arm and means for advancing said first transfer arm, including a drive wheel, a motor drive coupled to said drive wheel, a first elongated flexible member connected at a first end to the proximate end portion of said transfer arm and engaged and driven by said drive wheel, and guide means leading said elongated member from said drive wheel to said first transfer arm proximal end along a path through a point forward of said proximal end when said transfer arm is rearward of its advanced position.

2. The mechanism of claim 1 wherein said flexible member includes a second end opposite its first end connected to said first transfer arm proximal portion and guide means leading said flexible member between said second end and said drive wheel along a path through a point rearward of said transfer arm proximal portion when said transfer arm is forward of its retracted position.

3. The mechanism of claim 2 including a second arcuate transfer arm, second guide means supporting said second arcuate arm for movement between a retracted position with the distal end of said second transfer arm proximate the rear of said seat portion second side and an advanced position proximate to the distal end of the advanced first transfer arm, a second transfer member mounted on the distal end of said second transfer arm, a second felxible elongated member engaging said drive wheel and having opposite first and second ends connected to the distal portion of said second transfer arm, guide means leading the first and second ends of said second flexible member along paths traversing points between said drive wheel and the distal end of said second transfer arm when respectively, forwardly of said distal end, when said second transfer arm is rearwardly of its advanced position and rearwardly of said distal end when said second transfer arm is forwardly of its retracted position.

4. The mechanism of claim 3 wherein said flexible members comprise transversely ridged flexible cables, and said drive wheel comprises a roll provided with longitudinal recesses engageable with said cable ridges, said first and second flexible cables engaging opposite faces of said drive roll.

5. The mechanism of claim 3 wherein said second transfer member includes means releasably retaining said first coupling member in response to the engagement thereof consequent to the advance of said first and second transfer arms.

6. The mechanism of claim 5 wherein said second transfer member is movable with the retraction of said second transfer arm to the proximity of said second coupling member, and said second coupling member releasably engages said first coupling member with the retraction of said second transfer arm.

7. The mechanism of claim 3 wherein said second connecting means comprises a second spring biased belt retractor and a second belt extending from said second retractor and having said second coupling member positioned at the free end of said belt, said second transfer member engaging said second belt to advance said second belt and second coupling member with the advance of said second transfer arm, the advance of said transfer arms bringing said coupling members into mutual engagement.

8. The mechanism of claim 3 including a semicircular tubular case slideably housing said transfer arms and located rearwardly of said seat portion and having forwardly directed openings, and said motor and drive wheel are disposed below the top face of said seat portion.

9. The mechanism of claim 1 wherein said seat is located in a vehicle having a door and comprising a motor control network including a first switch actuated in response to the closing of said door, a second switch actuated in response to the occupation of said seat and means responsive to the actuation of said first and second switches to energize said motor to rotate in a forward direction to advance said transfer arm, and upon said transfer arm reaching its advanced position energizing said motor to rotate in a reverse direction to retract said transfer arm.

* * * * *